(12) United States Patent
Douglas et al.

(10) Patent No.: US 6,914,931 B2
(45) Date of Patent: Jul. 5, 2005

(54) SPREAD SPECTRUM RECEIVER KALMAN FILTER RESIDUAL ESTIMATOR METHOD

(75) Inventors: Randal K. Douglas, Redondo Beach, CA (US); Anthony S. Abbott, Rancho Palos Verdes, CA (US)

(73) Assignee: The Aerospace Corporation, El Segundo, CA (US)

( * ) Notice: Subject to any disclaimer, the term of this patent is extended or adjusted under 35 U.S.C. 154(b) by 821 days.

(21) Appl. No.: 09/964,115

(22) Filed: Sep. 26, 2001

(65) Prior Publication Data

US 2003/0058927 A1 Mar. 27, 2003

(51) Int. Cl.[7] .................................................. H04B 1/69
(52) U.S. Cl. .................... 375/147; 375/142; 375/367; 342/108; 342/189; 342/357.12

(58) Field of Search ................................. 375/147, 130, 375/140, 141, 142, 150, 367; 342/189, 108, 357.12

(56) References Cited

U.S. PATENT DOCUMENTS

2003/0085839 A1 * 5/2003 Zhodzishky et al. ... 342/357.12

* cited by examiner

*Primary Examiner*—Jean B. Corrielus
*Assistant Examiner*—Guillermo Munoz
(74) *Attorney, Agent, or Firm*—Derrick Michael Reid

(57) ABSTRACT

A GPS receiver receives GPS spread spectrum communication signals subject to carrier demodulation and code phase autocorrelation using tightly coupled Kalman filter residual estimation based on Ricatti matrix computation for generating code phase errors and carrier phase errors for improved code phase tracking and carrier phase tracking in feedback loops for use in navigation systems.

16 Claims, 4 Drawing Sheets

GPS SIGNAL RESIDUAL ESTIMATOR PROCESS

GPS INERTIAL NAVIGATION SYSTEM

WEAK LOCK GPS NAVIGATION PROCESSOR

ULTRATIGHT GPS NAVIGATION PROCESSOR

GPS SIGNAL RESIDUAL ESTIMATOR PROCESS

SPREAD SPECTRUM RECEIVER KALMAN FILTER RESIDUAL ESTIMATOR METHOD

REFERENCE TO THE RELATED APPLICATION

The present application is related to applicant's co-owned U.S. Pat. No. 6,516,021 entitled Global Positioning System and Inertial Measuring Unit Ultratight Coupling Method, now on the military critical technology list, for official use only.

STATEMENT OF GOVERNMENT INTEREST

The invention was made with Government support under contract No. F04701-00-C-0009 by the Department of the Air Force. The Government has certain rights in the invention.

FIELD OF THE INVENTION

The invention relates to the field of communications and navigation systems. More particularly, the present invention relates to communication systems coupled to inertial navigation systems having robust Kalman prefiltering generating residual estimates used for improved signal tracking.

BACKGROUND OF THE INVENTION

Two fundamental components of a GPS signal are a pseudorandom noise code and a carrier. Navigation data are derived from this signal by correlating it with code and carrier replicas generated by the GPS receiver. A code tracking loop attempts to drive the code correlation error, the difference between the receiver generated replica and the received signal, to zero by advancing or retarding the replica code rate. Receiver to satellite range, or pseudorange, is computed from the code phase because the code phase is determined by the time required for the signal to travel from the satellite to the receiver. When the code correlation error is small the receiver is said to be in code lock.

The carrier loop tracks either the carrier frequency or phase by beating a replicated carrier against the received signal to generate an error harmonic. The measured frequency of the error is fed through a filter to form a correction to the carrier replica oscillator. The receiver is said to be in carrier lock when the error harmonic frequency is small, typically less than ten Hertz. Receiver to satellite range rate, or pseudorange rate, is computed from the replicated carrier frequency offset, or Doppler shift, from the nominal carrier frequency. A 50.0 Hertz navigation message superimposed on all GPS signals admits a 180° degree phase ambiguity in the carrier. A frequency locked loop or a phase locked loop implemented as a Costas loop allows tracking with no loss of lock across data bit changes. Both code and carrier tracking loops adjust the phase and frequency of the generated replicas to account for many factors, which include receiver and satellite motion, receiver clock drift, and ionospheric and tropospheric signal delays.

Nonzero tracking errors appear as unmodeled range and range rate errors that corrupt the navigation solution. With navigation updates computed nominally once per second, only the most recent data taken prior to the measurement time are included in measurements provided to the navigation filter. Most of the correlation data taken over the one-second interval are used to keep the tracking loop in lock. This is determined by the tracking loop bandwidth, which, if set too low, will not track the signal through receiver acceleration or turns.

In traditional tracking loops, there is the possibility that the errors in the loops are time correlated because there is a delay in the loops as the loops drive the error signal to zero. Depending on the order of the tracking loop, there may actually be a steady state tracking error when the order of the dynamic motion exceeds the order of the tracking loop. This is commonly called the dynamic stress error. Even with inertial aiding to the tracking loop, the tracking error can be time correlated because of time correlated errors in the aiding data. This possibility has limited tracking performance because the tracking loop measurement errors can manifest themselves as errors in the state vector after processing, which in turn can affect future aiding data and possibly cause the IMU navigation and GPS tracking system to generate a wrong but consistent navigation solution. With normal tracking loops, the GPS measurements used by the navigation filter are deliberately spaced out in time to avoid the unwanted temporal correlations of the tracking loops.

In conventional tracking loops, the measurement noise variance used by the navigation filter is usually estimated from the tracking state and the carrier to noise ratio. There is no guarantee that these values are consistent with the actually realized measurement errors. Hence, a large integration navigation filter may process measurements with an erroneous uncertainty variance of the measurement noise. The navigation filter can be implemented as a Kalman filter.

In conventional tracking loops, the measurement of pseudorange acceleration is not considered because there is no apparent way to obtain a low noise estimate of the pseudorange acceleration from the tracking loops. Conventional tracking loops do not have an ability to determine the pseudorange acceleration. The use of a pseudorange acceleration measurement has many potential benefits in the observability of user clock and IMU error instability. With a pseudorange acceleration measurement, there is a more direct measurement of higher order errors with increased observability. Normally, these errors are observed through dynamic coupling into pseudorange and pseudorange rate measurements. Hence, without the pseudorange acceleration measurements, the observability of clock and IMU instabilities is limited. This limitation can be reduced using highly accurate user clocks and inertial measuring units.

Advanced tracking loop designs have been proposed to alleviate some of the loss of lock and reacquisition problems by tightly coupling IMU data with the carrier and code tracking loops and centralizing the navigation and correlation functions. With the navigation filter essentially forming part of the tracking loop, the computational burden becomes very high because the navigation filter that now has many states must also be updated at tens of Hertz rather than the conventional one Hertz.

With unlimited navigation filter processor throughput, the navigation filter could be operated at extremely high rates with no loss of optimality due to time correlated tracking loop errors. This high rate operation is similar to what has been called a vector delay lock loop. A vector delay lock loop is a method to track all satellites in view simultaneously with one common algorithm. The vector delay lock loop broadens the normal aided and unaided tracking loop design approach to both code and carrier tracking on all in view satellites. The entire algorithm must run at very high processing rates because there is no provision for federated processing. Unfortunately, current processor throughput cannot support Kalman filter rates of several tens of Hertz with the large state vectors required for GPS inertial navigation. Large Kalman filters may be decomposed into one or more federated Kalman filters within a Kalman filter processing architecture. For example, a large Kalman filter can be decomposed into two partitions including a large integration Kalman filter and a high rate optimal prefilter that are more compatible with modern processing speed requirements. The fundamental principle is to decompose the complete formulation into suitable partitions such that the important bandwidths and models are appropriate for each partition. In IMU aided GPS sets designed to date, large navigation filters have not been decomposed into suitable partitions to allow optimal processing of the raw GPS samples with the IMU samples.

Another approach to aiding the code and carrier correlation process is to design a tracking filter that provides estimates of carrier phase tracking error, rate and acceleration, satellite to user range error, and signal amplitude. The filtered estimates, which are processed at a high rate, are provided to the navigation filter where they are processed at a much lower rate to form the navigation solution. An extended Kalman filter of this design has fifth order or higher order dynamics and an associated matrix Riccati equation that must be integrated with each correlator datum. The computational burden is extraordinarily high.

Tightly coupled navigation solutions require estimation of the residual error in real time for computation of carrier phase error and code phase error during carrier demodulation and autocorrelation. Computational requirements of Kalman filter residual estimation suffer from computation complexity. These and other disadvantages are solved or reduced using the invention.

SUMMARY OF THE INVENTION

An object of the invention is to provide a method for improved code phase tracking in spread spectrum communication systems.

Another object of the invention is to provide a method for improved code phase tracking and carrier phase tracking in spread spectrum communication systems.

Yet another object of the invention is to provide a method for improved code phase tracking and carrier phase tracking in spread spectrum communication systems using a tightly coupled residual estimating Kalman filter.

Still another object of the invention is to provide a method for improved code phase tracking and carrier phase tracking in GPS spread spectrum communications using a tightly coupled residual estimating Kalman filter in a GPS navigation system.

A further object of the invention is to provide a method for generating code phase tracking errors and carrier phase tracking errors respectively for code phase tracking and carrier phase tracking of GPS spread spectrum communication signals using a residual estimating Kalman prefilter operating on Ricatti matrices for improved autocorrelation locking in a GPS navigation system.

The present invention is a communication method directed to carrier phase and code phase tracking using Kalman filter residual estimation well suited for spread spectrum communication systems such as GPS navigation systems. Inphase and quadrature correlation data are processed to provide estimates of carrier phase tracking error and rate and acceleration, as well as code phase tracking error, and signal amplitude. The filter state is a tracking residual applicable to navigation solution correction in ultratight GPS coupling with inertial measurements. The tracking residual estimation drives the code and carrier replica oscillators in tightly coupled correlation loops providing adjusted early and late code replicas and adjusted demodulation carriers for closed-loop code and carrier tracking. The close-loop code and carrier tracking can also be applied to a weak lock navigation systems also using the tracking residual estimation to the code and carrier replica oscillators.

The method improves interference robustness and navigation accuracy. Improved interference robustness is realized first, through the use of a code tracking and carrier tracking Kalman filter with a Riccati matrix computation process wherein tracking is achieved without the need for consistent signal lock in the usual sense. Second, all correlator early and late inphase and quadrature input to the Kalman filter contribute to form the measurement residual. Third, since correlator early and late inphase and quadrature do not need to be processed in real time to keep tracking loops in lock, application of more advanced algorithms in low signal to noise conditions becomes feasible.

Navigation accuracy is improved by real time computation of a residual variance using the Ricatti matrix. The real time computation allows a navigation processor to rapidly compute navigation solutions in the presence of noisy signals. Range acceleration availability enables rapid navigation solution convergence with improved observability of signal instabilities. Using correlation data taken over a computational time interval provides accurate tracking error estimates.

A tracking filter for the code and carrier correlation process of a GPS receiver provides estimates of carrier phase tracking error, rate and acceleration, range error, and signal amplitude. Both inphase and quadrature measurements are processed by the Kalman filter residual estimator. The filter dynamics and associated Riccati equations that are independent of the phase error enable implementation of steady state point designs. The Kalman filter state is a tracking residual applicable as a navigation solution correction well suited for ultratight GPS and IMU coupling. The tracking residual is used to drive the code and carrier oscillators for adjusting early and late code replicas and demodulation carrier signals for improved interference robustness and navigation accuracy. The filter state is an observation measurement residual that can be directly used by the navigation filter as a navigation solution correction. The error dynamics are independent of carrier phase tracking error. Harmonic terms in the phase error are not present in the filter Riccati equation nor in the error dynamics for enabling implementation of a steady state design. The real time Kalman filter processing uses filter state estimates to directly command both code and carrier correlation processes. These and other advantages will become more apparent from the following detailed description of the preferred embodiment.

DETAILED DESCRIPTION OF THE PREFERRED EMBODIMENT

Figure 1:
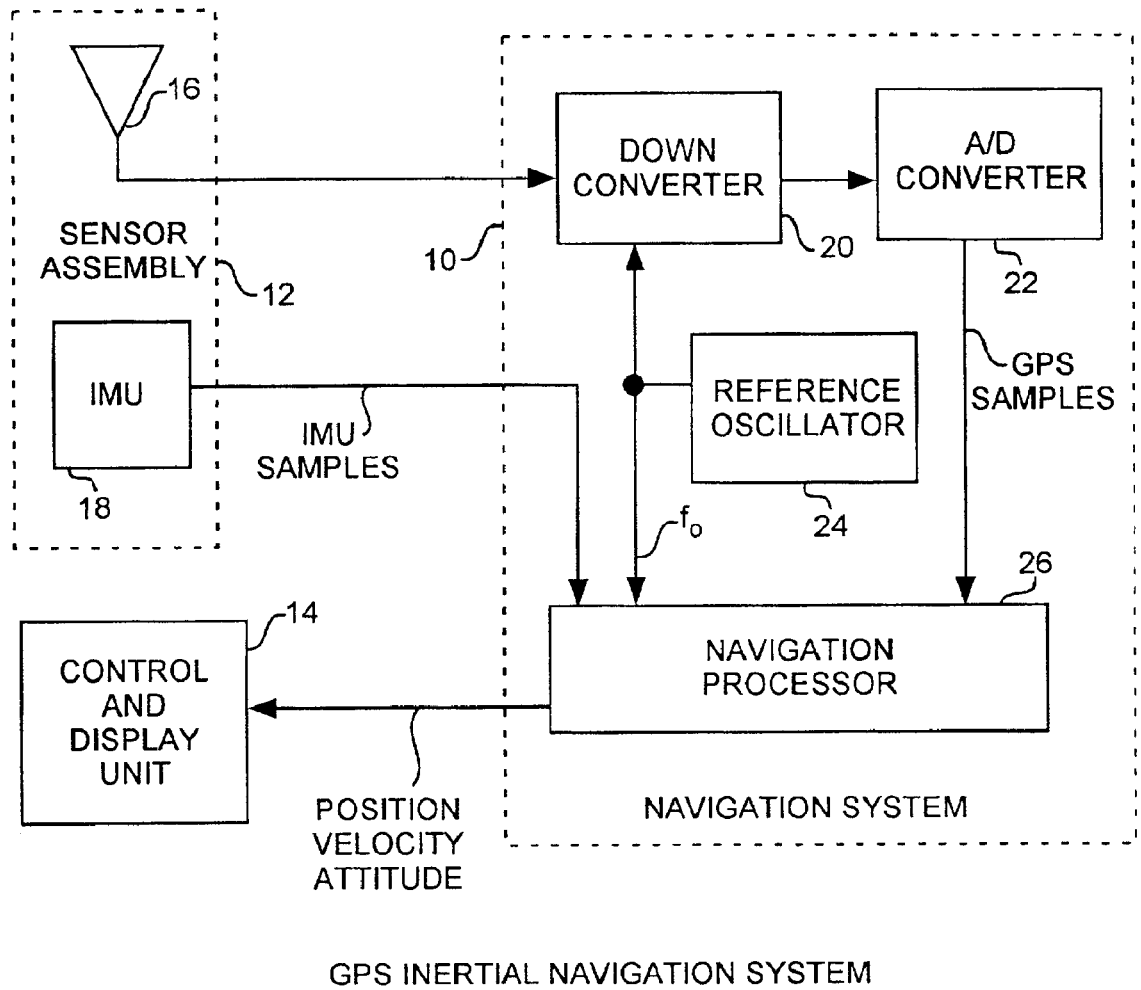
FIG. 1 is a block diagram of a GPS inertial navigation system.

An embodiment of the invention is described with reference to the figures using reference designations as shown in the figures. Referring to FIG. 1, a global positioning system (GPS) inertial navigation system includes a navigation system 10 receiving GPS signals and inertial measurement unit samples from a sensor assembly 12 and provides position and velocity data to a control and display unit 14. The navigation system 10 functions as a GPS inertial navigation system tracking GPS signals from a plurality of in view satellites, not shown. The sensor assembly 12 includes an antenna 16 for receiving and providing received GPS signals and includes an inertial measurement unit (IMU) 18 providing the IMU sample signals, both of which are communicated to the navigation system 10. The navigation system 10 includes a downconverter 20 for frequency downconversion of the received GPS signals using a reference oscillator 24 providing an $f_o$ internal frequency reference, and includes an analog to digital (A/D) converter 22 communicating digitized GPS samples to a navigation processor 26. The navigation processor 26 also receives the IMU samples and provides the position and velocity data to the control and display unit 14.

Figure 2A:
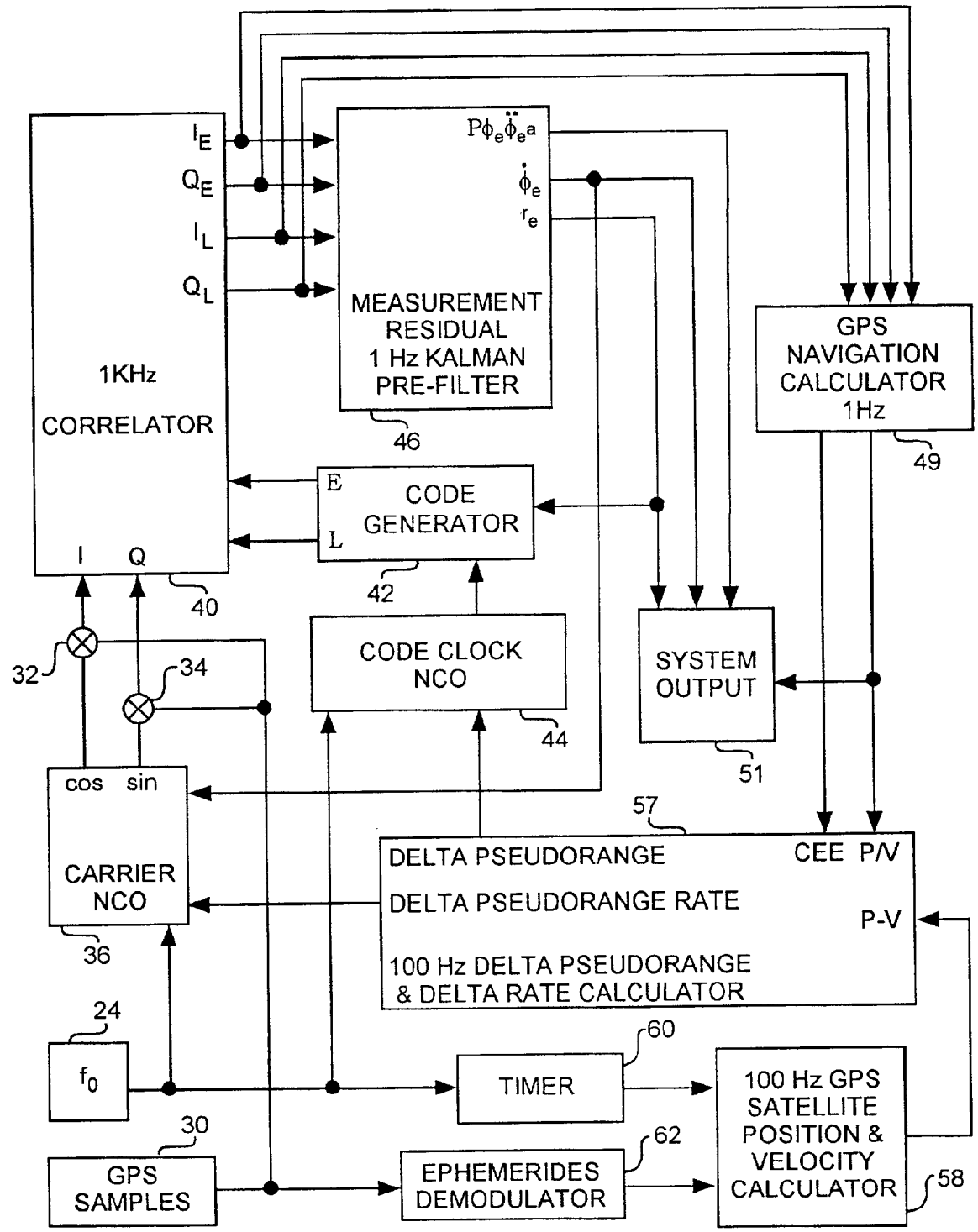
FIG. 2A is a block diagram of a weak lock GPS navigation processor.
Figure 2B:
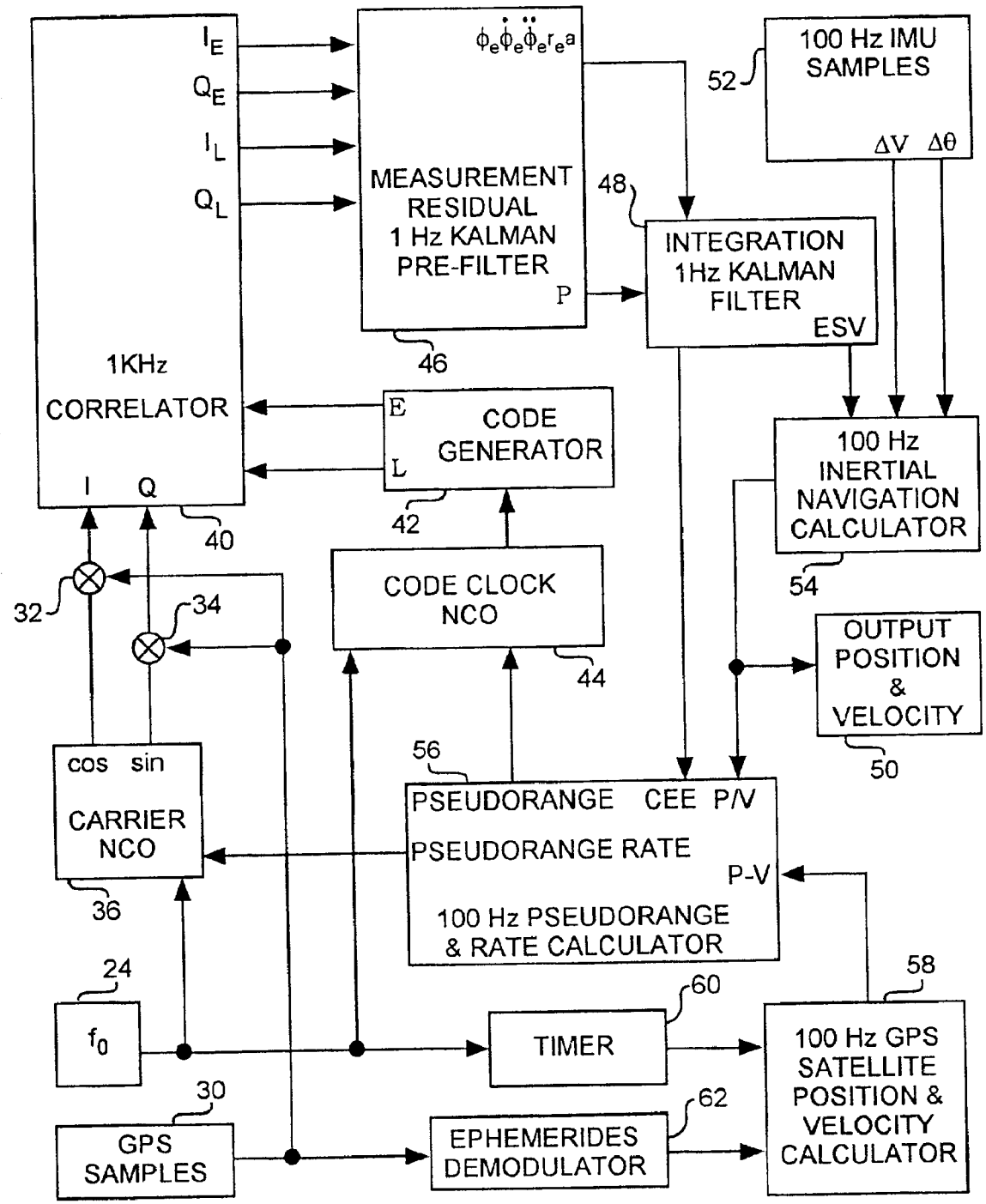
FIG. 2B is a block diagram of an ultratight GPS navigation processor.

Referring to FIGS. 1, 2A and 2B, and more particularly to FIG. 2A, the navigation system 10 may be a weak lock navigation system that includes a navigation processor 26 receiving the digitized GPS samples 30 that are communicated to mixers 32 and 34 for providing inphase (I) and quadrature (Q) signals respectively using cos and sin demodulation signals from a carrier numerically controlled oscillator (NCO) 36 using the reference oscillator $f_o$ 24. The cos and sin demodulation signals are replica carrier signals for carrier demodulating the received GPS samples 30. The I and Q sample signals are received by a correlator 40 receiving early (E) and late (L) code replica signals from a chipping code generator 42 receiving a chipping code clocking signal from a code clock NCO 44. The code generator 42 may further include a prompt replica, not shown, for improved sampling. The chipping code may be a direct sequence spread spectrum code. The correlator 40 may operate, for example, at 50 Hz. The correlator 40 provides inphase and quadrature, early and late, GPS correlated sample signals $I_E$, $Q_E$, $I_L$, and $Q_L$, communicated, for example, at 1K Hertz into a measurement residual Kalman prefilter 46 having, for example, a one Hertz output. The prefilter 46 can receive I and Q sampled outputs from one or more correlators 40 to accommodate dual $f_1$ and $f_2$ frequency integration using, for example, two respective NCOs 36 and 44 and two respective code generators 42, for providing an integrated error vector to the single integration filter 48. The Kalman prefilter 46 computes the residual carrier phase errors $\phi_e$, carrier frequency error $\dot{\phi}_e$, carrier frequency rate error $\ddot{\phi}_e$, residual code phase error $r_e$ and a matrix P. The carrier phase errors $\phi_e$, $\dot{\phi}_e$, and $\ddot{\phi}_e$ may, in the context of inertial navigation, respectively correspond to a pseudorange, pseudorange rate and pseudorange acceleration. The carrier frequency error $\dot{\phi}_e$ is the first time rate of change derivative of the carrier phase error $\phi_e$. The carrier frequency rate error $\ddot{\phi}_e$ is the second time rate of change derivative of the carrier phase error $\phi_e$. The Kalman prefilter 46 also computes the amplitude a, code phase error $r_e$, and a measurement covariance matrix P as part of a measurement vector. The Kalman prefilter 46 computes the measurement state covariance matrix P indicating the uncertainties in the measurement vector of errors for a number of samples m over a major cycle epoch time. The Kalman prefilter 46 can be used as part of a weak lock method using local carrier and code tracking loops for improved code and carrier tracking. The Kalman prefilter 46 can further be used in an ultratight method for GPS pseudorange computation tightly coupled with the correlation process to improve the ability to maintain tracking lock upon the received GPS signals.

In the exemplar weak lock GPS navigation processor, the correlator outputs $I_E$, $Q_E$, $I_L$, and $Q_L$ are also sampled by a GPS navigation calculator 49. The Kalman prefilter 46 and GPS navigation calculator 49 provide system outputs 51 including the receiver position and velocity output P/V. The code phase error $r_e$ is communicated to the code generator 42 in a local code phase tracking loop. Concurrently, the carrier frequency error $\dot{\phi}_e$ is fed to the carrier NCO in a carrier tracking loop. The navigation calculator 49 computes the best estimate of the navigation state vector solution defined by the position and velocity data P/V. The GPS navigation calculator 49 computes user clock error estimates (CEE) communicated to a pseudorange and rate calculator 56.

In the exemplar ultratight GPS navigation processor, IMU samples 52 are communicated to a 100 Hz inertial navigation calculator 54 providing the receiver position and velocity outputs P/V. The Kalman prefilter measurement vector of errors and the state covariance matrix P are communicated to the one Hertz integration Kalman filter 48 having a one second major cycle time period between Kalman filter epochs. The integration Kalman filter 48 in turn repetitively provides estimates of the position and velocity errors in an error state vector (ESV) that are used to compute the position and velocity output data 50 communicated to the control unit 14. The IMU samples 52 are communicated to a 100 Hz inertial navigation calculator 54 that computes the best estimate of the navigation state vector solution defined by GPS receiver position and velocity data P/V. The term P/V indicates the calculated position and velocity data. The position and velocity data P/V is calculated from the IMU samples 52 and the error state vector ESV. At the end of each of the one second major cycles, the Kalman filter 48 updates the ESV and then communicates the ESV to the navigation calculator 54. The IMU samples 52 are repetitively generated, for example, one hundred times a second, and include differential velocity samples $\Delta V$ and differential attitude samples $\Delta \theta$ that are communicated to the 100 Hz inertial navigation calculator 54 also receiving the error state vector (ESV) every second from the integration Kalman filter 48. The integration Kalman filter 48 computes the user clock error estimates (CEE) that are communicated to the pseudorange and rate calculator 56. The 100 Hz inertial navigation calculator 54 is used for strapdown inertial navigation processing.

In the exemplar weak lock navigation processor of FIG. 2A, the navigation calculator 49 provides the best estimate of the navigation state vector solution indicated by the position and velocity data (P/V) communicated to the 100 Hz delta pseudorange and delta pseudorange rate calculator 57 that in turn provides delta pseudorange rate data to the carrier NCO 36 and provides delta pseudorange data to the code NCO 44. The delta pseudorange and delta pseudorange rate calculator 57 receives calculated GPS satellite position and velocity (P-V) data from a 100 Hz GPS satellite position and velocity calculator 58 and receives the user clock error estimates (CEE). The term P-V references the GPS satellite calculated position and velocity data. The clock error estimates (CEE) include a clock phase error and clock frequency error that is the time derivative of the clock phase error. The calculated delta pseudorange is equal to the change in the geometric line of sight range to a satellite adjusted by the clock phase error estimates CEE and certain signal propagation compensation terms, such as the nominal ionospheric and tropospheric delays that are not shown. The delta pseudorange is a change in the geometric range taken within respect to the one Hertz prefilter 46 updates applied to the carrier NCO 36 and the code generator 42. The geometric range is computed from the GPS calculated position and velocity data P-V, and from the navigation calculated position and velocity data P/V. The delta pseudorange rate is equal to the change in the relative geometric velocity to the satellite from the user antenna 16 plus the clock frequency error estimate. The GPS satellite position and velocity calculator 58 receives timing signals from a timer 60 using the reference $f_o$ 24 and receives demodulated ephemeris data from an ephemeris demodulator 62 using the GPS samples 30 to compute the GPS satellite position and velocity data P-V. The weak lock formulation accommodates larger errors between the replica signal and the received signal by observing the errors over many data samples and correcting the replica signal at a much lower rate than the sampling rate of the correlation process inputs.

In the exemplar ultratight navigation processor of FIG. 2B, the navigation calculator 54 provides the best estimate of the navigation state vector solution indicated by the position and velocity data (P/V) communicated to the 100 Hz pseudorange and pseudorange rate calculator 56 that in turn provides pseudorange rate data to the carrier code NCO 36 and provides pseudorange data to the code NCO 44. The pseudorange and pseudorange rate calculator 56 receives calculated GPS satellite position and velocity (P-V) data from a 100 Hz GPS satellite position and velocity calculator 58 and receives the user clock error estimates (CEE). The term P-V references the GPS satellite calculated position and velocity data. The clock error estimates (CEE) include a clock phase error and clock frequency error that is the time derivative of the clock phase error. The calculated pseudorange is equal to the geometric line of sight range to a satellite adjusted by the clock phase error estimates CEE and certain signal propagation compensation terms, such as the nominal ionospheric and tropospheric delays that are not shown. The geometric range is computed from the GPS calculated position and velocity data P-V, and from the IMU calculated position and velocity data P/V. The pseudorange rate is equal to the relative geometric velocity to the satellite from the user antenna 16 plus the clock frequency error estimate. The GPS satellite position and velocity calculator 58 receives timing signals from a timer 60 using the reference $f_o$ 24 and receives demodulated ephemeris data from an ephemeris demodulator 62 using the GPS samples 30 to compute the GPS satellite position and velocity data P-V.

The GPS satellite position and velocity calculator 58 is used for satellite GPS position and velocity calculation. The pseudorange and pseudorange rate calculator 56 is used for line of sight pseudorange and pseudorange rate predictions. The delta pseudorange and delta pseudorange rate calculator 57 is used for indicating changes in line of sight pseudorange and pseudorange rate predictions. The carrier NCO 36 is used for generating carrier replica signals for quadrature demodulation of the received GPS samples 30. The code generator 42 is used for early and late code replica signal generation. The correlator 40 is used for integrate and dump correlation of the I and Q carrier demodulated signals correlated with the early and late code replica signals.

The correlation process is based upon the early and late replica code signal generation by the code generator 42 and upon the replica carrier generation by the carrier NCO 36. As the pseudorange and pseudorange rate data from the calculator 56 are refreshed during each cycle, the replica carrier cos and sin signals from the carrier NCO 36 and the early and late replica codes signals from the code generator 42 are adjusted under close loop processing. The correlator 40 may operate at 50 Hz enabling conventional early and late correlation by providing the early and late I and Q samples to the Kalman prefilter 46. The Q and I samples contain amplitudinal informational that can be used with signal correlation functions to estimate the code and carrier errors. The carrier and code phase offsets of the replica signals as compared to the received GPS sample signal can be determined as offsets knowledge of the signal correlation function. The carrier and code phase offsets are used to estimate the residual errors.

Figure 3:
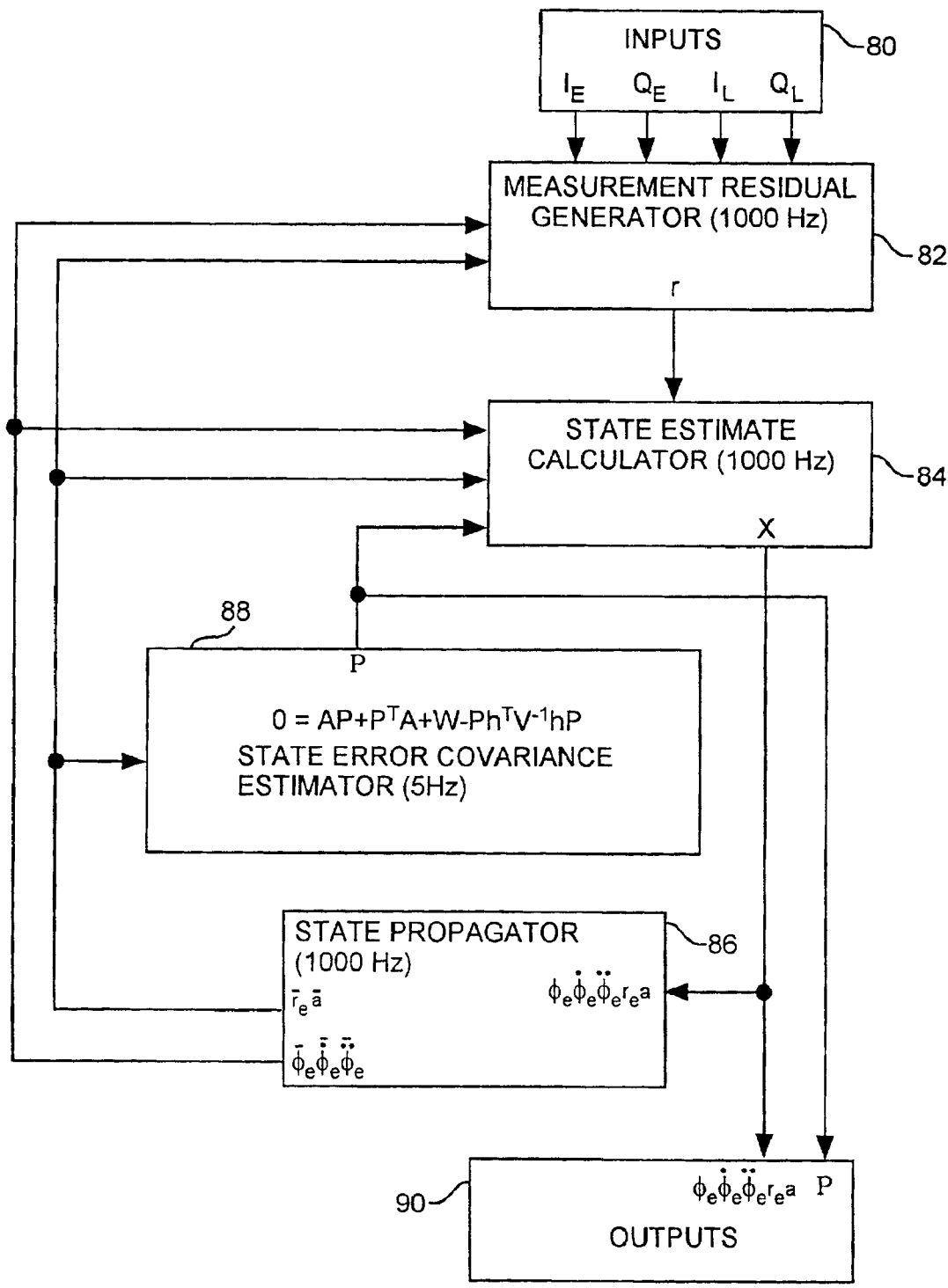
FIG. 3 is a flow diagram of a GPS signal residual estimator process.

Referring to all of the Figures, and more particularly to FIG. 3, the measurement residual Kalman prefilter 46 is based on a GPS signal residual estimation process that receives the process inputs $I_E$, $Q_E$, $I_L$, and $Q_L$ that are taken as the correlator early (E) and late (L), and, inphase (I) and quadrature (Q) samples from the correlator 40. The process inputs $I_E$, $Q_E$, $I_L$, and $Q_L$ may be processed at a rate of 1 KHz. The process inputs are represented collectively by the symbol set $Y=[I_E,Q_E,I_L,Q_L]$. The GPS signal residual prefilter 46 has four process components or algorithms, including a 1 KHz measurement residual generator 82, a 1 KHz state estimate calculator 84, a state propagator 86, and a 5 Hz state error covariance estimator 88. The GPS signal residual estimator process receives the process input y and generates the residual measurements $\phi_e$, $\dot{\phi}_e$, $\ddot{\phi}_e e$, $r_e$, and a.

The measurement residual generator 82 computes a measurement residual r at 1 KHz from the process input y and the propagated state $\bar{x}$. The propagated state $\bar{x}$ has five components where $\bar{x}=[\bar{\phi}_e, \dot{\bar{\phi}}_e, \ddot{\bar{\phi}}_e, \bar{r}_e, \bar{a}]$. The propagated state $\bar{x}$ includes the carrier phase error state $\bar{\phi}_e$, the carrier frequency error state $\dot{\bar{\phi}}_e$, the carrier frequency rate error state $\ddot{\bar{\phi}}_e$, code phase error state $\bar{r}_e$ that is related to the range from the receiver to the satellite, and the signal amplitude state $\bar{a}$.

Each component of the measurement residual r depends on the carrier phase error state $\bar{\phi}_e$, code phase error state $\bar{r}_e$, the early to late replicated code offset $\delta_r$, the broadcast data d, and the signal amplitude state $\bar{a}$ of the received spread spectrum signal 30. There is a nonlinear relationship between the residual components and the measurement residual r defined by an r matrix.

$$r = \begin{bmatrix} I_e - \bar{a}dc(\bar{r}_e + \delta_r)\cos\bar{\phi}_e \\ Q_e - \bar{a}dc(\bar{r}_e + \delta_r)\sin\bar{\phi}_e \\ I_l - \bar{a}dc(\bar{r}_e - \delta_r)\cos\bar{\phi}_e \\ Q_l - \bar{a}dc(\bar{r}_e - \delta_r)\sin\bar{\phi}_e \end{bmatrix}$$

In the residual matrix, the code correlation function c(•) depends on the pseudorandom noise code chip width $\lambda_{ca}$ as defined by a c(ρ) pseudorandom noise code equation.

$$c(\rho) = \max\left(1 - \frac{|\rho|}{\lambda_{ca}}, -\frac{1}{\lambda_{ca}}\right)$$

In the c(ρ) pseudorandom noise code equation for a coarse acquisition (CA) receiver, the nominal code rate $\omega_{ca}$ is known as the chipping rate where $\omega_{ca}=1.023\times10^6$ chips/sec. Because the speed of light is $C=2.99792458\times10^8$ m/sec, the CA code chip width is $\lambda_{ca}=293.1$ m. The true code rate differs slightly from $\omega_{ca}$ due to user to satellite relative motion and atmospheric transmission effects. For the case where the early and late codes are offset from the correlation peak by ¼ chip, $\delta_r=\lambda_{ca}\cong73.26$ m. The broadcast message data is $d=\pm1$ and has a nominal 20.0 millisecond period.

A state update calculator 84 computes the state estimate x at a rate of 1 KHz. From the measurement residual r, from the propagated state $\bar{x}$, and from a state error covariance estimate P, the state estimate x is equal to $\bar{x}+K(\bar{x},P)r$, where K is the gain. The gain K depends on components of the propagated state $\bar{x}$ and depends on the Riccati matrix P. The gain K is computed to minimize the error variance as a linear Kalman filter gain $K(\bar{x}, P)=Ph^T(\bar{x})V^{-1}\delta_t$, where $h^T$ is a transposed linearized observation matrix and $V^{-1}$ is an inverse observation covariance. The term $\delta_t$ is a time step and may be, for example, 0.001 second. The term $h(\bar{x})$ is a linearized observation matrix. The term V is the measurement noise variance as used in an observation equation of the y process input.

The filter measurement $y \in R^4$, where y is the process input including observations $I_E$, $Q_E$, $I_L$, $Q_L$, is modeled as a nonlinear function of the true state $x_o$, which is not known, with additive noise v as $y=G(x)+v$ with $G(x)$ given by a $G(x)$ observation matrix of the true state $x_o$.

$$G(x) = \begin{bmatrix} adc(r_e + \delta_r)\cos\phi_e \\ adc(r_e + \delta_r)\sin\phi_e \\ adc(r_e - \delta_r)\cos\phi_e \\ adc(r_e - \delta_r)\sin\phi_e \end{bmatrix}$$

In the G(x) observation matrix, the amplitude a, the code phase error $r_e$, and the carrier phase error $\phi_e$ components can be a true state $x_o$ having $a_o$, $r_o$, and $\phi_o$ components. The process input y is the sum of the observation matrix G(x) and the additive noise v, as in an observation equation of the y process input.

$$y = \begin{bmatrix} I_e \\ Q_e \\ I_l \\ Q_l \end{bmatrix} = \begin{bmatrix} adc(r_e + \delta_r)\cos\phi_e \\ adc(r_e + \delta_r)\sin\phi_e \\ adc(r_e - \delta_r)\cos\phi_e \\ adc(r_e - \delta_r)\sin\phi_e \end{bmatrix} + \begin{bmatrix} v_{ie} \\ v_{qe} \\ v_{il} \\ v_{ql} \end{bmatrix}$$

The additive disturbance $v \in R^4$ is taken to be a random process with a zero-mean Gaussian distribution and the observation covariance V. The observation covariance V reflects correlation with respect to the early and late, inphase and quadrature correlator output signals but with the additive disturbance v where $v=[v_{ie}, v_{qe}, v_{il}, v_{ql}]$, where v is uncorrelated both in time and with respect to the I and Q correlator output signals. With $\delta=\frac{1}{2}$ being the offset, normalized to the code wavelength, between the early and late correlation signals, then the observation noise covariance V is given by an observation expectation covariance equation.

$$V = E[vv^T] = (a\eta)^2 \begin{bmatrix} 1 & 0 & \gamma & 0 \\ 0 & 1 & 0 & \gamma \\ \gamma & 0 & 1 & 0 \\ 0 & \gamma & 0 & 1 \end{bmatrix}$$

The observation expectation covariance equation includes a measurement noise structure matrix including the terms 0, 1 and $\gamma$ that define a measurement noise structure. In the covariance expectation equation, E is a statistical expectation of the additive disturbance v, $\gamma=1-\delta$, the scalar a is the signal amplitude is a component of the state x, and $1/\eta$ is the signal-to-noise ratio. The observation covariance matrix V can be shown as an exemplar observation matrix $V_o$.

$$V_o = (0.3)^2 \begin{bmatrix} 0.990 & -0.004 & 0.478 & 0.218 \\ -0.004 & 1.004 & -0.227 & 0.488 \\ 0.478 & -0.227 & 1.001 & -0.005 \\ 0.218 & 0.488 & -0.005 & 1.005 \end{bmatrix}$$

The state estimation error e is defined as $e=x_o-\bar{x}$ as in a state estimation error equation.

$$\dot{e}=[A-Kh(\bar{x})]e-Kv+\omega$$

In the state estimation error equation, $\dot{e}$ is the time derivative of the state error estimate. The process input measurement y is expressed as a function of the state estimation e in a y expansion equation.

$$y = G(x_o) + v = G(\bar{x}) + \frac{\partial G}{\partial x}\bigg|_{\bar{x}} e + \cdots + v$$

The the expansion equation, y expanded about the propagated state state $\bar{x}$. In the expansion equation, y is the process input from the correlator 40 and the first partial derivative of the observation matrix G(x) is the linearized observation matrix $h(\bar{x})$ and is defined by an $h(\bar{x})$ partial derivative equation.

$$h(\bar{x}) = \frac{\partial G}{\partial x}\bigg|_{\bar{x}}$$

The $h(\bar{x})$ partial derivative equation can be written in matrix form as an $h(\bar{x})$ linearized observation matrix equation.

$$h(\bar{x}) = \begin{bmatrix} -\bar{a}dc(\bar{r}_e + \delta_r)\sin\bar{\phi}_e & 0 & 0 & \bar{a}dc'(\bar{r}_e + \delta_r)\cos\bar{\phi}_e & dc(\bar{r}_e + \delta_r)\cos\bar{\phi}_e \\ \bar{a}dc(\bar{r}_e + \delta_r)\cos\bar{\phi}_e & 0 & 0 & \bar{a}dc'(\bar{r}_e + \delta_r)\sin\bar{\phi}_e & dc(\bar{r}_e + \delta_r)\sin\bar{\phi}_e \\ -\bar{a}dc(\bar{r}_e - \delta_r)\sin\bar{\phi}_e & 0 & 0 & \bar{a}dc'(\bar{r}_e - \delta_r)\cos\bar{\phi}_e & dc(\bar{r}_e - \delta_r)\cos\bar{\phi}_e \\ \bar{a}dc(\bar{r}_e - \delta_r)\cos\bar{\phi}_e & 0 & 0 & \bar{a}dc'(\bar{r}_e - \delta_r)\sin\bar{\phi}_e & dc(\bar{r}_e - \delta_r)\sin\bar{\phi}_e \end{bmatrix}$$

In the $h(\bar{x})$ linearized observation matrix equation, $c'(\bar{r}_e+\delta_\gamma)$ and $c'(\bar{r}_e-\delta_\gamma)$ are the code correlation sensitivities to range error, and can be expressed by range partial differential equations.

$$c'(\bar{r}_e + \delta_r) = \frac{\partial}{\partial \bar{r}_e} c(\bar{r}_e + \delta_r)$$

$$c'(\bar{r}_e - \delta_r) = \frac{\partial}{\partial \bar{r}_e} c(\bar{r}_e - \delta_r)$$

$$\frac{\partial c(\rho)}{\partial \bar{r}_e} = \begin{cases} 0 & |\rho| > \lambda_{ca} \\ \frac{1}{\lambda_{ca}} & 0 > \rho > -(\lambda_{ca} + 1) \\ -\frac{1}{\lambda_{ca}} & 0 < \rho < (\lambda_{ca} + 1) \end{cases}$$

The state propagator 86 computes at 1 KHz the propagated state $\bar{x}$ where the propagated state components are $\bar{\phi}_e$, $\bar{\phi}_e$, $\bar{\phi}_e$, $\bar{r}_e$, $\bar{a}$. The state propagation dynamics are linear, such that, $\bar{\phi}_e=\phi_e+\dot{\phi}_e\delta_t+\ddot{\phi}_e\delta_t^2$, $\bar{\dot{\phi}}_e=\dot{\phi}_e+\ddot{\phi}_e\delta_t$, $\bar{\ddot{\phi}}_e=\ddot{\phi}_e$, $\bar{r}_e=r_e+(\lambda_{L1}/2\pi)\delta_t\dot{\phi}_e$, and $\bar{a}=a$, wherein $\delta_t=0.001$ sec and $\delta_t$ is the propagation period, and $\lambda_{L1} \cong 0.1903$ m, that is, $\lambda_{L1}$ is the carrier wavelength. The L1 band carrier frequency is $\omega_{L1}$ and $\omega_{L1}=2.99792458\times10^9$ Hz, so that $\lambda_{L1}=C/\omega_{L1} \cong 0.1903$ m, where C is the speed of light.

The state error covariance estimator 88 provides a state covariance estimate P at 5 Hz preferably only using the $\bar{x}$ propagated state components $\bar{r}_e$ and $\bar{a}$. The state covariance estimator 88 may be implemented as a look-up table. Elements of a P scheduling look-up table, that could be a trivial look-up table of only one element, are computed using a state dynamic matrix A. A continuous time representation of the state dynamics is linear with $\dot{x}=Ax+\omega$, with $\dot{x}$ being the time derivative of the state x, and with A being the state dynamics matrix.

$$A = \begin{bmatrix} 0 & 1 & 0 & 0 & 0 \\ 0 & 0 & 1 & 0 & 0 \\ 0 & 0 & 0 & 0 & 0 \\ 0 & \frac{\lambda_{L1}}{2\pi} & 0 & 0 & 0 \\ 0 & 0 & 0 & 0 & 0 \end{bmatrix}$$

In the state dynamics matrix A, $\lambda_{L1} \cong 0.1903$ m and is the carrier wavelength. The additive disturbance $\omega \in R^5$ is taken to be a random process with a zero-mean Gaussian distribution and state covariance W. The state error covariance matrix P is provided by a continuous time Riccati equation.

$$\dot{P} = AP + P^T A + W - Ph^T V^{-1} hP$$

In the continuous time Riccati equation, $\dot{P}$ is the time derivative of the Riccati state error covariance matrix P, A is the state dynamics matrix, $V^{-1}$ in an inverse observation covariance, h is the linearized observation matrix, $h^T$ is a transposed linearized observation matrix, W is the state covariance, and P is the Riccati matrix. The measurement noise structure, as in the covariance expectation equation, leads to a product $h^T(x)V^{-1}h(x)$ that does not depend on carrier phase error $\phi_e$ nor the carrier frequency error $\dot{\phi}_e$. The inverse observation covariance $V^{-1}$ is given by an inverse covariance expectation equation.

$$V^{-1} = (a\eta)^{-2} \begin{bmatrix} 1 & 0 & -\gamma & 0 \\ 0 & 1 & 0 & -\gamma \\ -\gamma & 0 & 1 & 0 \\ 0 & -\gamma & 0 & 1 \end{bmatrix} \frac{1}{1-\gamma^2}$$

In the covariance expectation equation, $\gamma=(1-\delta)$ and $\delta=\frac{1}{2}$ is the normalized early to late code offset $\delta_r$.

The product $h^T V^{-1} h$ is then defined by a scalar covariance equation.

$$h^T(x)V^{-1}h(x) = \begin{bmatrix} q_{\phi\phi} & 0 & 0 & 0 & 0 \\ 0 & 0 & 0 & 0 & 0 \\ 0 & 0 & 0 & 0 & 0 \\ 0 & 0 & 0 & q_{rr} & q_{ra} \\ 0 & 0 & 0 & q_{ra} & q_{aa} \end{bmatrix}$$

In the scalar covariance equation, the scalar covariance terms $q_{\phi\phi}$, $q_{rr}$, $q_{ra}$, and $q_{aa}$ are defined by scalar covariance equations.

$$q_{\phi\phi} = a^2(c_p^2 + 2\gamma c_p c_m + c_m^2)$$

$$q_{rr} = a^2(c'^2_p + 2\gamma c'_p c'_m + c'^2_m)$$

$$q_{aa} = c_p^2 + 2\gamma c_p c_m + c_m^2$$

$$q_{ra} = a[c_p c'_p + \gamma(c_p c'_m + c_m c'_p) + c_m c'_m]$$

In the scalar equations $c_p = c(r_e + \delta_r)$, $c'_p = c'(r_e + \delta_r)$, $c_m = c(r_e - \delta_r)$, $c'_m = c'(r_e + \delta_r)$. The term $h^T V^{-1} h$ does not depend on message data $d = \pm 1$ because the message data d is a multiplication factor of each term in $h(x)$ and $d^2 = 1$. The product $h^T V^{-1} h$ depends only on range error $r_e$ and signal amplitude a. Because $h^T V^{-1} h$ does not depend on the harmonics $\sin \phi_e$ or $\cos \phi_e$, the continuous time Riccati equation has steady-state solutions with respect to constant values for $r_e$ and a. Point design and gain trajectories can be determined with respect to the range error $r_e$ and the amplitude a. A constant error dynamics solution is determined by setting the range error and the signal amplitude to nominal values $r_e = 0$ and $a = 1$.

Because the product $h^T V^{-1} h$ depends only on the range error, that is, the code phase $r_e$ and the signal amplitude a, a steady-state solution of the continuous time Riccati equation can be expressed as an algebraic Riccati equation.

$$0 = AP + P^T A + W - Ph^T V^{-1} hP$$

Nominal closed-loop filter dynamics are found by setting the state covariance matrix W in the observation covariance matrix V to place the closed-loop filter poles at $\sigma(A - Kh) = \{-335, -152, -106, -8.7 \pm 4.9i\}$.

$$W = \begin{bmatrix} 10 & 0 & 0 & 0 & 0 \\ 0 & 10^3 & 0 & 0 & 0 \\ 0 & 0 & 10^6 & -3 \times 10^5 & 0 \\ 0 & 0 & -3 \times 10^5 & 10^5 & 0 \\ 0 & 0 & 0 & 0 & 1 \end{bmatrix}$$

$$V = 10^{-4} I_4$$

In the state covariance matrix W, the cross terms are found to improve the damping in the carrier frequency error rate $\dot{\phi}_e$ response. The process outputs are the state estimate x and state error covariance estimate P with the state estimate x including the $\phi_e$, $\dot{\phi}_e$, $\ddot{\phi}_e$, $r_e$, and a components.

The use of the algebraic Riccati equation enables state error covariance estimation in real time in the Kalman prefilter 46. The Kalman prefilter 46 provides code phase error and carrier phase error signals for adjusting the code phase and carrier phase for improved code phase tracking and carrier phase tracking. Those skilled in the art can make enhancements, improvements, and modifications to the invention, and these enhancements, improvements, and modifications may nonetheless fall within the spirit and scope of the following claims.

What is claimed is:

1. A method for carrier tracking and spread spectrum code tracking in a spread spectrum communication system, the method comprising the steps of, receiving a spread spectrum input signal having inphase and quadrature components communicating a spread spectrum code modulating a carrier, carrier generating quadrature demodulation signals referenced to a local reference, the quadrature demodulation signals having a carrier phase referenced to the carrier, demodulating the spread spectrum input signal by the quadrature demodulation signals for generating the inphase and quadrature components, code generating early and late code replicas of the spread spectrum code, the early and late code replicas having a code phase referenced to the spread spectrum code, correlating the inphase and quadrature components by the early and late code replicas for generating early and late inphase and quadrature correlation signals, residual generating a residual from the early and late inphase and quadrature correlation signals and from a code phase error state and an amplitude state and a carrier phase error state, calculating a code phase error and an amplitude and a carrier phase error and a carrier frequency error from the residual and a state error covariance matrix and the code phase error state and the amplitude state and the carrier phase error state and a frequency error state, propagating the code phase error state and the amplitude state and the carrier phase error state and the carrier frequency error state from the code phase error and the amplitude and the carrier phase error and the carrier frequency error, Riccati estimating the state error covariance matrix from the code phase error state and the amplitude state, carrier phase adjusting the quadrature demodulation signals by the carrier phase error for reducing the carrier phase between the carrier and the quadrature demodulation signals for tracking the carrier, and code phase adjusting the early and late code replicas by the code phase error for reducing the code phase between the spread spectrum code and early and late code replicas for tracking the spread spectrum code.

2. The method of claim 1 wherein, the state error covariance matrix is a Riccati state error covariance matrix P defined by an algebraic Riccati equation of the form $0=AP+P^TA+W-Ph^TV^{-1}hP$ where A is a state dynamics matrix, $V^{-1}$ is an inverse observation covariance, h is a linearized observation matrix, $h^T$ is a transposed linearized observation matrix, and W is a state covariance.

3. The method of claim 1 wherein the communication system is a GPS receiver and the code phase error is a range error.

4. The method of claim 1 wherein, the spread spectrum input signal is a GPS spread spectrum signal, the local reference is a local oscillator for coherent demodulation of the spread spectrum input signal, and the spread spectrum code is a direct sequence spread spectrum code.

5. The method of claim 1 wherein the code phase error state and the amplitude state are assigned constant nominal values during the estimating step.

6. The method of claim 1 further comprising the steps of, transmitter calculating a transmitter position and a transmitter velocity from the spread spectrum input signal, receiver calculating a receiver position and a receiver velocity from the early and late inphase and quadrature correlation signals, range calculating a range and a range rate from the transmitter and receiver positions and velocities, the range rate further adjusting the quadrature demodulation signals for reducing the carrier phase between the carrier and the quadrature demodulation signals for tracking the carrier, the range further adjusting the early and late code replicas for reducing the code phase between the spread spectrum code and early and late code replicas for tracking the spread spectrum code.

7. The method of claim 1 wherein, the calculating step further calculates a carrier frequency rate error, the propagating step further propagates a carrier frequency rate error state, and the residual generating step generates the residual from the early and late inphase quadrature correlation signals and from the code phase error state and the amplitude state and the carrier phase error state.

8. The method of claim 1 wherein the residual generating step and the calculating step and the propagating step and the Riccati estimating step are a Kalman prefiltering process in a spread spectrum receiver in the spread spectrum communication system.

9. A method for carrier tracking and spread spectrum code tracking in a GPS navigation processor in a GPS spread spectrum receiver, the method comprising the steps of, receiving a GPS spread spectrum input signal having inphase and quadrature components communicating a spread spectrum code modulating a carrier, carrier generating quadrature demodulation signals referenced to a local reference, the quadrature demodulation signals having a carrier phase referenced to the carrier, demodulating the GPS spread spectrum input signal by the quadrature demodulation signals for generating the inphase and quadrature components, code generating early and late code replicas of the spread spectrum code, the early and late code replicas having a code phase referenced to the spread spectrum code, correlating the inphase and quadrature components by the early and late code replicas for generating early and late inphase and quadrature correlation signals, residual generating a residual from the early and late inphase and quadrature correlation signals and from a code phase error state and an amplitude state and a carrier phase error state, calculating a code phase error and an amplitude and a carrier phase error and a carrier frequency error from the residual and a state error covariance matrix and the code phase error state and the amplitude state and the carrier phase error state and a frequency error state, propagating the code phase error state and the amplitude state and the carrier phase error state and the carrier frequency error state from the code phase error and the amplitude and the carrier phase error and the carrier frequency error, Riccati estimating the state error covariance matrix from the code phase error state and the amplitude state, navigation calculating a receiver position and a receiver velocity from the early and late inphase and quadrature correlation signals, satellite calculating a satellite position and a satellite velocity from the GPS spread spectrum input signal, range calculating a pseudorange and a pseudorange rate from the receiver and satellite positions and velocities, carrier phase adjusting the quadrature demodulation signals from the pseudorange rate and by the carrier phase error for reducing the carrier phase between the carrier and the quadrature demodulation signals for tracking the carrier, and code phase adjusting the early and late code replicas from the pseudorange and by the code phase error for reducing the code phase between the spread spectrum code and early and late code replicas for tracking the spread spectrum code.

10. The method of claim 9 wherein, the navigation calculating step further calculates clock error estimates, and the range calculating step calculates the pseudorange and the pseudorange rate from the receiver and satellite positions and velocities and from the clock error estimates.

11. The method of claim 9 wherein the residual generating step and the calculating step and the propagating step and the Riccati estimating step are a Kalman prefiltering process in the GPS spread spectrum receiver.

12. The method of claim 9 wherein, the state error covariance matrix is a Riccati state error covariance matrix P defined by an algebraic Riccati equation of the form $0=AP+P^TA+W-Ph^TV^{-1}hP$ where A is a state dynamics matrix, $V^{-1}$ is an inverse observation covariance, h is a linearized observation matrix, $h^T$ is a transposed linearized observation matrix, and W is a state covariance.

13. A method for carrier tracking and spread spectrum code tracking in an inertial GPS navigation processor in a GPS spread spectrum receiver receiving inertial measurement samples, the method comprising the steps of, receiving a GPS spread spectrum input signal having inphase and quadrature components communicating a spread spectrum code modulating a carrier, carrier generating quadrature demodulation signals referenced to a local reference, the quadrature demodulation signals having a carrier phase referenced to the carrier, demodulating the GPS spread spectrum input signal by the quadrature demodulation signals for generating the inphase and quadrature components, code generating early and late code replicas of the spread spectrum code, the early and late code replicas having a code phase referenced to the spread spectrum code, correlating the inphase and quadrature components by the early and late code replicas for generating early and late inphase and quadrature correlation signals, residual generating a residual from the early and late inphase and quadrature correlation signals and from a code phase error state and an amplitude state and a carrier phase error state, calculating a code phase error and an amplitude and a carrier phase error and a carrier frequency error from the residual and a state error covariance matrix and the code phase error state and the amplitude state and the carrier phase error state and a frequency error state, propagating the code phase error state and the amplitude state and the carrier phase error state and the carrier frequency error state from the code phase error and the amplitude and the carrier phase error and the carrier frequency error, Riccati estimating the state error covariance matrix from the code phase error state and the amplitude state, integrating the amplitude and the code phase error and the carrier phase error and the carrier frequency error and the state error covariance matrix for providing an error state vector, navigation calculating a receiver position and a receiver velocity from the error state vector and from the inertial measurement samples, satellite calculating a satellite position and a satellite velocity from the GPS spread spectrum input signal, range calculating a pseudorange and a pseudorange rate from the receiver and satellite positions and velocities, carrier phase adjusting the quadrature demodulation signals from the pseudorange rate for reducing the carrier phase between the carrier and the quadrature demodulation signals for tracking the carrier, and code phase adjusting the early and late code replicas from the pseudorange for reducing the code phase between the spread spectrum code and early and late code replicas for tracking the spread spectrum code.

14. The method of claim 13 wherein, the integrating step further provides clock error estimates, and the range calculating step calculates the pseudorange and the pseudorange rate from the receiver and satellite positions and velocities and from the clock error estimates.

15. The method of claim 13 wherein the residual generating step and the calculating step and the propagating step and the Riccati estimating step are a Kalman prefiltering process in the GPS spread spectrum receiver.

16. The method of claim 13 wherein, the state error covariance matrix is a Riccati state error covariance matrix P defined by an algebraic Riccati equation of the form $0=AP+P^TA+W-Ph^TV^{-1}hP$ where A is a state dynamics matrix, $V^{-1}$ is an inverse observation covariance, h is a linearized observation matrix, $h^T$ is a transposed linearized observation matrix, and W is a state covariance.

* * * * *